(12) United States Patent
Schroeder et al.

(10) Patent No.: US 8,905,428 B2
(45) Date of Patent: Dec. 9, 2014

(54) FOLDABLE STROLLER AND FOLD JOINT FOR A FOLDABLE STROLLER

(75) Inventors: Brady Matthew Schroeder, Milton, GA (US); Thomas M. Perrin, Alpharetta, GA (US)

(73) Assignee: Graco Children's Products Inc., Atlanta, GA (US)

( * ) Notice: Subject to any disclaimer, the term of this patent is extended or adjusted under 35 U.S.C. 154(b) by 3 days.

(21) Appl. No.: 13/426,532

(22) Filed: Mar. 21, 2012

(65) Prior Publication Data
US 2012/0242062 A1 Sep. 27, 2012

Related U.S. Application Data

(60) Provisional application No. 61/454,999, filed on Mar. 21, 2011.

(51) Int. Cl.
*B62B 7/00* (2006.01)
*B62B 7/08* (2006.01)

(52) U.S. Cl.
CPC ........................................ *B62B 7/08* (2013.01)
USPC ....................................................... 280/650

(58) Field of Classification Search
CPC ........ B62B 2205/20; B62B 7/062; B62B 7/08
USPC ............. 280/650, 643, 648, 642, 647, 47.38; 403/105
See application file for complete search history.

(56) References Cited

U.S. PATENT DOCUMENTS

| | | |
|---|---|---|
| 5,190,390 A | 3/1993 | Ming-Tai |
| 5,240,265 A | 8/1993 | Huang |
| 5,388,853 A | 2/1995 | Lauro |
| 5,513,864 A | 5/1996 | Huang |
| 5,553,885 A | 9/1996 | Chang |
| 5,605,409 A | 2/1997 | Haut et al. |
| 5,634,564 A | 6/1997 | Spamer et al. |
| 5,755,455 A | 5/1998 | Chen et al. |
| 5,765,958 A | 6/1998 | Lan |
| 5,794,951 A | 8/1998 | Corley et al. |
| 5,845,924 A | 12/1998 | Huang |
| 5,865,460 A | 2/1999 | Huang |
| 5,871,227 A | 2/1999 | Huang |

(Continued)

FOREIGN PATENT DOCUMENTS

| | | |
|---|---|---|
| EP | 0885797 A1 | 12/1998 |
| EP | 1614605 A1 | 1/2006 |

(Continued)

*Primary Examiner* — J. Allen Shriver, II
*Assistant Examiner* — Brian Cassidy
(74) *Attorney, Agent, or Firm* — Lempia Summerfield Katz LLC

(57) ABSTRACT

A stroller fold joint has first and second joint parts. The first part has a hosel coupled to a hub body with a circumferential surface and a pivot axis. The second part has a connector coupled to two plates. The hub body is between the plates and the two joint parts pivot about the pivot axis between a folded and an unfolded orientation. A tunnel through the hub body is perpendicular to the pivot axis. A shuttle slides within the tunnel and has latch end and an actuator end. The latch end is adjacent the hub body's circumferential surface at one tunnel end and the actuator end extends into the hosel. The shuttle is not exposed and is covered when the fold joint is in the folded or unfolded orientations and when moving therebetween.

19 Claims, 14 Drawing Sheets

(56) References Cited

U.S. PATENT DOCUMENTS

| | | | |
|---|---|---|---|
| 6,062,587 A | 5/2000 | Cabagnero | |
| 6,062,588 A | 5/2000 | Cheng | |
| 6,095,548 A | 8/2000 | Baechler | |
| 6,099,019 A | 8/2000 | Cheng | |
| 6,105,998 A | 8/2000 | Baechler et al. | |
| 6,152,477 A | 11/2000 | Hsin et al. | |
| 6,174,028 B1 | 1/2001 | Yang et al. | |
| 6,196,571 B1 | 3/2001 | Chen et al. | |
| 6,238,125 B1 * | 5/2001 | Lin | 403/102 |
| 6,302,613 B1 | 10/2001 | Lan | |
| 6,378,892 B1 | 4/2002 | Hsia | |
| 6,409,205 B1 | 6/2002 | Bapst et al. | |
| 6,416,077 B1 | 7/2002 | Chen et al. | |
| 6,422,586 B1 | 7/2002 | Glover | |
| 6,494,479 B1 | 12/2002 | Cheng | |
| 6,523,853 B1 * | 2/2003 | Cheng | 280/642 |
| 6,594,840 B2 * | 7/2003 | Tomas et al. | 5/655 |
| 6,682,090 B2 | 1/2004 | Chen | |
| 6,886,851 B2 | 5/2005 | Chen | |
| 6,896,286 B2 | 5/2005 | Lin | |
| 6,908,101 B2 | 6/2005 | Chen | |
| 6,910,708 B2 | 6/2005 | Sack et al. | |
| 7,281,732 B2 | 10/2007 | Fox et al. | |
| 7,441,794 B2 | 10/2008 | Lan | |
| 7,543,840 B2 | 6/2009 | Lin | |
| 7,614,641 B2 | 11/2009 | Hartenstine et al. | |
| 7,632,035 B2 * | 12/2009 | Cheng | 403/98 |
| 7,766,366 B2 | 8/2010 | Li | |
| 7,780,183 B2 * | 8/2010 | Chen et al. | 280/647 |
| 8,226,110 B2 * | 7/2012 | Liao | 280/642 |
| 8,342,563 B2 * | 1/2013 | Lin | 280/642 |
| 8,444,170 B2 * | 5/2013 | Chen et al. | 280/642 |
| 8,448,977 B2 * | 5/2013 | Grintz et al. | 280/642 |
| 8,480,116 B2 * | 7/2013 | Li | 280/643 |
| 8,485,547 B2 * | 7/2013 | Hsu | 280/647 |
| 2002/0041082 A1 | 4/2002 | Perego | |
| 2004/0071499 A1 | 4/2004 | Chen | |
| 2008/0211206 A1 | 9/2008 | Thorne et al. | |
| 2009/0058026 A1 | 3/2009 | Park et al. | |
| 2010/0127480 A1 | 5/2010 | Ahnert et al. | |
| 2010/0201103 A1 | 8/2010 | Kretschmer et al. | |
| 2010/0230933 A1 | 9/2010 | Dean et al. | |
| 2011/0148076 A1 | 6/2011 | Chen | |
| 2011/0181024 A1 | 7/2011 | Chicca | |
| 2011/0291389 A1 * | 12/2011 | Offord | 280/650 |

FOREIGN PATENT DOCUMENTS

| | | |
|---|---|---|
| EP | 1783028 A1 | 5/2007 |
| EP | 1842760 A2 | 10/2007 |
| EP | 1847439 A1 | 10/2007 |
| EP | 1889772 A2 | 2/2008 |
| EP | 1916173 A2 | 4/2008 |
| EP | 1967439 A2 | 9/2008 |

\* cited by examiner

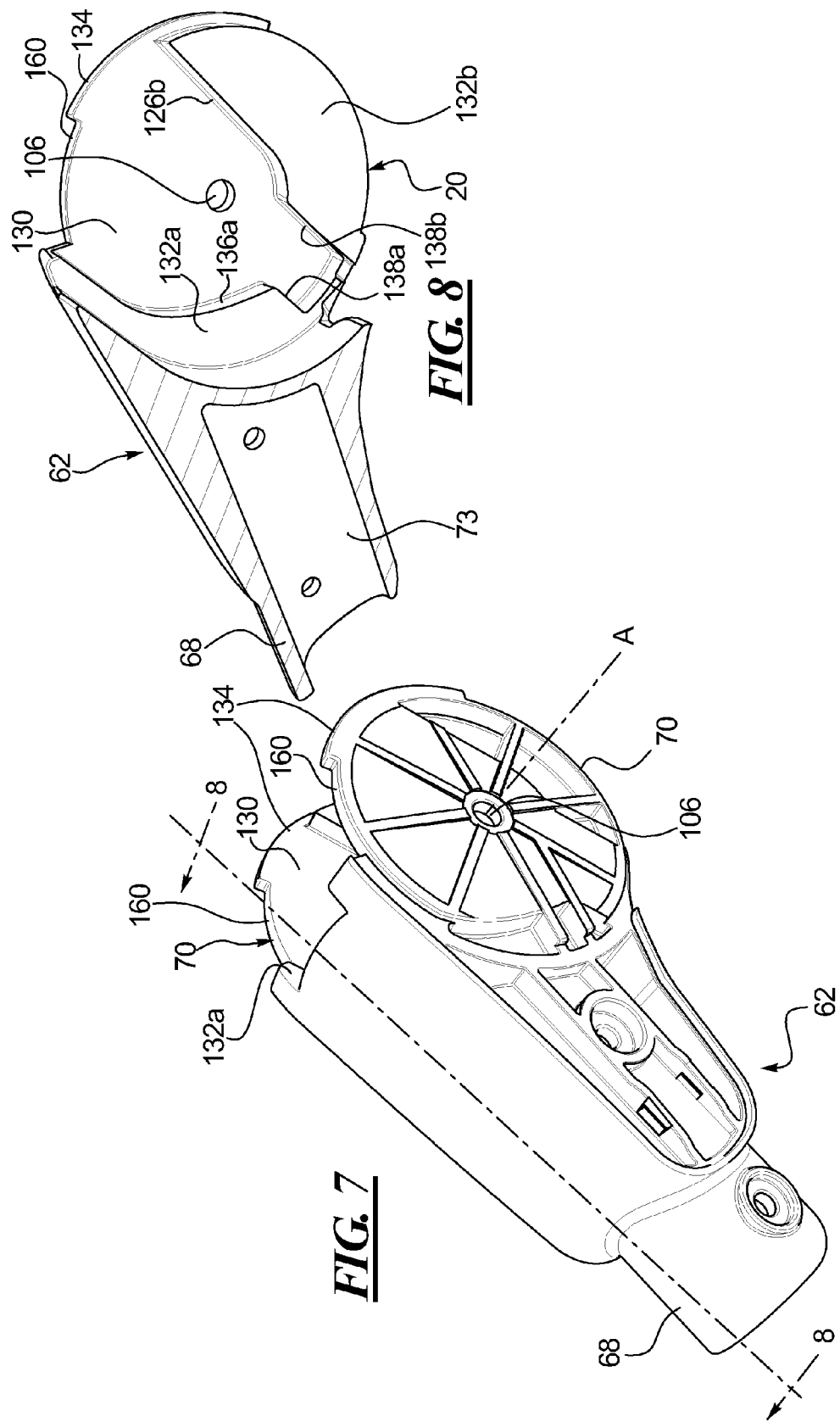

FOLDABLE STROLLER AND FOLD JOINT FOR A FOLDABLE STROLLER

RELATED APPLICATION DATA

This patent is related to and claims priority benefit of U.S. provisional application Ser. No. 61/454,999 entitled "Foldable Stroller and Fold Joint for a Foldable Stroller" and filed on Mar. 21, 2011. The entire contents of the aforementioned provisional application are hereby incorporated herein by reference.

BACKGROUND

1. Field of the Disclosure

The present invention is generally directed to foldable strollers, and more particularly to a fold joint configuration and to a folded seat configuration for a foldable stroller.

2. Description of Related Art

Folding strollers are known in the art and typically include a plurality of frame components on each side of the stroller frame. The frame components are often pivotally connected to one another at a fold joint located on each side of the stroller frame. The fold joints are constructed to latch or lock such strollers in an in-use configuration. The fold joints are also typically constructed to be released or unlatched, permitting the stroller frame to be folded, i.e., to be reconfigured to a folded configuration.

A conventional fold joint exposes portions of the latch and sometimes portions of the frame components that are coupled to the fold joint, particularly when the frame is folded or partially folded. Such fold joints and frame components can create one or more shear points or pinch points at the fold joint. Such pinch points can pinch or damage objects caught between parts at the pinch points, i.e., between portions of the frame and/or fold joint, during folding or unfolding of the stroller frame.

Folding A-frame type strollers are also known in the art. An A-frame stroller typically has two frame sides and each side has components arranged in a configuration that mimics the capital letter A when viewed from either side. An A-frame stroller is typically folded by pivoting the handle push bars rearward and downward toward the rear legs of the stroller. When an A-frame stroller is folded, the seat bottom seating surface, seat back seating surface, or both are positioned to face outward from the folded frame structure. One or both of the seating surfaces are also positioned close to or generally aligned with an outermost plane of the folded frame structure. Thus, when the folded stroller is stowed, the seating surfaces can easily become dirty or contaminated. This is because the exposed seating surfaces are positioned facing outward and can come in direct contact with and rub against other surfaces on which the folded stroller is stored. If the folded A-frame style stroller is stowed or stored against a dirty surface, such as a truck bed, a basement floor, a garage floor, or the like, the seating surfaces can become dirty and contaminated.

SUMMARY

In one example according to the teachings of the present invention, a stroller fold joint has a first joint part with a hub body having a puck shape, a circumferential surface, and a pivot axis extending transversely through the hub body. A second joint part has two plates with confronting surfaces spaced apart by a gap therebetween. The hub body is captured in the gap between the two plates. The first and second joint parts are pivotable relative to one another about the pivot axis between a folded orientation and an unfolded orientation. Cam surfaces are defined on the confronting surfaces of the two plates. A latch slot is defined on the confronting surfaces of the two plates adjacent the cam surfaces. A tunnel extends along and through the hub body perpendicular to the pivot axis. A shuttle is slidable within the tunnel and has a latch end and an actuator end. The shuttle is biased to a latched position with the latch end captured in the latch slot retaining the fold joint in the unfolded orientation. Moving the shuttle to a released position withdraws the latch end from the latch slot, permitting relative rotation of the first and second joint parts from the unfolded orientation to the folded orientation.

In one example, when the fold joint is moved from the unfolded orientation toward the folded orientation, the latch end of the shuttle can bear against the cam surfaces.

In one example, when the fold joint moves from the unfolded orientation to the folded orientation, the cam surfaces can guide the latch end of the shuttle back to the latched position.

In one example, when the fold joint is moved from the folded orientation to the unfolded orientation, the latch end can be guided by the cam surfaces back to the released position when adjacent the latch slot.

In one example, when the fold joint is moved from the folded orientation to the unfolded orientation, the latch end can clear the cam surfaces and align with the latch slot.

In one example, a spring can bias the shuttle toward the latched position and when the latch end clears the cam surfaces the spring can fire the shuttle into the latch slot and to the latched position.

In one example, the actuator end of the shuttle can be connected to a release cable.

In one example, the shuttle can have an elongate body and a first slot formed therethrough. A pivot pin through the hub body and two plates can define the pivot axis and can pass through the first slot.

In one example, one end of the tunnel can be aligned with a hosel bore of a hosel on the first joint part and the actuator end of the shuttle can project from the hub body into the hosel bore.

In one example, one end of the tunnel can open to the circumferential surface of the hub body opposite the hosel.

In one example, the tunnel can bisect the hub body and can be aligned with the pivot axis.

In one example, the circumferential surface of the hub body can be substantially closed, other than where ends of the tunnel open into the circumferential surface. The circumferential surface can be exposed as the fold joint is moved between the folded and unfolded orientations.

In one example, one end of the tunnel can be aligned with a hosel bore of a hosel on the first joint part and the other end of the tunnel can open to the circumferential surface of the hub body opposite the hosel. A tunnel or bore cover can be secured to the hub body closing off the other end of the tunnel.

In one example according to the teachings of the present invention, a stroller fold joint has a first joint part with a frame connection hosel coupled to a hub body. The hub body has a puck shape, a circumferential surface, and a pivot axis extending transversely through the hub body. A second joint part has a frame connector coupled to two plates. A gap is defined between confronting spaced apart surfaces of the two plates. The hub body is sandwiched between the two plates and the first and second joint parts are pivotable about the pivot axis relative to one another between a folded orientation and an unfolded orientation. A tunnel extends along and through the hub body perpendicular to the pivot axis. A shuttle is slidable within the tunnel and has an elongate body, a latch end, and an actuator end. The latch end is positioned adjacent the circumferential surface of the hub body at one end of the tunnel and the actuator end extends at least into the frame connection hosel. When the fold joint is in the folded orientation, the unfolded orientation, or moving therebetween, the shuttle is not exposed but covered by portions of the fold joint.

In one example, a bore cover can be attached to the circumferential surface of the hub body and over the one end of the tunnel.

In one example, an end of a first stroller frame part can be received within the frame connection hosel and an end of a second stroller frame part can be received within the frame connector. The ends of the first and second stroller frame parts are also not exposed when the fold joint is in the folded orientation, the unfolded orientation, or moving therebetween.

In one example, a bore cover can be attached to the circumferential surface of the hub body and over the one end of the tunnel. Only the circumferential surface of the hub body and/or the bore cover may be exposed between the two plates.

In one example according to the teachings of the present invention, a stroller frame assembly has a pair of frame sides. Each frame side has a front frame leg having an upper end, a handle push bar having a lower end, and a fold joint. The fold joint has a first joint part with a hosel coupled to a hub body. The hub body has a puck shape, a circumferential surface, and a pivot axis extending transversely through the hub body. The lower end of the push bar is received within the hosel. A second joint part has a connector coupled to two plates having a gap between confronting spaced apart surfaces of the two plates. The hub body is sandwiched between the two plates and the upper end of the front frame leg is received within the connector. The first and second joint parts are pivotable about the pivot axis relative to one another between a folded orientation and an unfolded orientation. The fold joint also has a tunnel extending along and through the hub body perpendicular to the pivot axis. A shuttle is slidable within the tunnel and has an elongate body, a latch end, and an actuator end. The latch end is positioned adjacent the circumferential surface of the hub body at one end of the tunnel and the actuator end extends at least into the hosel. When the fold joint is in the folded orientation, the unfolded orientation, or moving therebetween, the shuttle, the lower end of the push bar, and upper end of the front frame leg are not exposed but covered by portions of the fold joint.

In one example according to the teachings of the present invention, a foldable stroller frame has two spaced apart frame sides. Each frame side has a fold joint, a front leg with an upper end connected to the fold joint, a rear leg with an upper end connected to the fold joint, a handle push bar with a lower end coupled to the fold joint, and a link extending between the front leg and rear leg and coupled to each below the fold joint. The stroller frame also has a seat assembly with a seat bottom connected to a seat back at a seat bight region. When the handle push bars are pivoted rearward and downward to fold the stroller frame to a folded configuration, the seat back and the seat bottom fold inward at the seat bight region toward one another so that the seating surfaces of the seat back and seat bottom face toward one another.

In one example, the stroller frame can have a depth between the handle push bars and the front legs in the folded configuration. The seat back can be positioned forward of the handle push bars and the seat bottom can be positioned rearward of the front legs in the folded configuration.

In one example, the stroller frame can also have a flexible lanyard with free ends. Each free lanyard end can be connected at a first connection point to part of a respective one of the fold joints and routed under the seat bottom near a rear edge of the seat bottom. The stroller frame can also have a seat back recline strap with free ends. Each strap free end can be connected at a second connection point to part of a respective one of the fold joints and routed around the back side of the seat back. The first connection points can be higher than the second connection points with the stroller frame in a set-up configuration and lower than the second connection points with the stroller frame in the folded configuration.

BRIEF DESCRIPTION OF THE DRAWINGS

Objects, features, and advantages of the present invention will become apparent upon reading the following description in conjunction with the drawing figures, in which:

FIG. 7 shows an inside perspective view of a second one of the fold joint parts shown in FIG. 6.

FIG. 8 shows a cross-section taken along line 8-8 of the fold joint part shown in FIG. 7.

DETAILED DESCRIPTION OF THE DISCLOSURE

The disclosed stroller frames, seat, and fold joints solve or improve upon one or more of the above-noted and/or other problems and disadvantages with prior known strollers. In one example, the disclosed stroller frames fold up in a conventional A-frame style manner. The disclosed fold joint retains the stroller frame in a set-up or in-use configuration, releases the stroller frame to allow folding when unlatched or released, and significantly reduces or eliminates pinch points at or near the fold joint during folding and unfolding. In one example, the disclosed fold joint hides or covers the latch components within a housing defined by the fold joint. In one example, the disclosed fold joint hides or covers the ends of the frame parts connected to the fold joint.

In one example, the disclosed stroller seat folds up when the stroller frame folds. The disclosed seat folds up in such a manner so as to not expose the seating surfaces to the exterior or outer structural parameters of the folded stroller frame. These and other objects, features, and advantages of the present invention will become apparent upon reviewing this disclosure.

Figure 1:
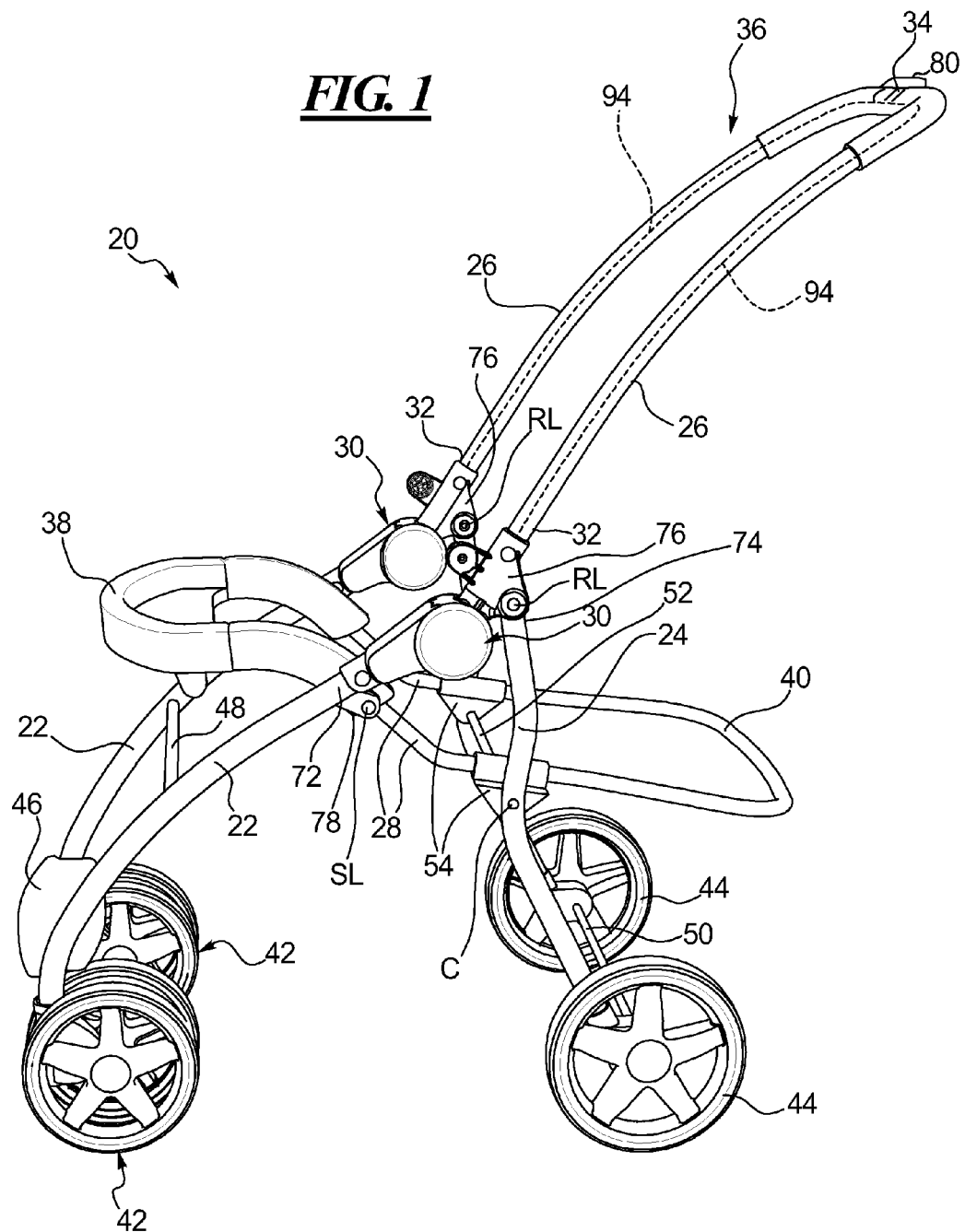
FIG. 1 shows a left side perspective view of one example of a stroller frame constructed in accordance with the teachings of the present invention and in an in-use or set-up configuration.

Turning now to the drawings, FIG. 1 shows a side view of one example of a frame assembly 20 of a stroller constructed in accordance with the teachings of the present invention. The frame assembly 20 is shown in an in-use configuration in FIG. 1. The frame assembly 20 is depicted herein with no seat assembly, seat, or seat components in order to more easily depict the frame assembly and fold joint components relevant to one aspect of the present invention. The frame assembly 20 generally has left and right, spaced apart frame sides. Each frame side has a front leg 22, a rear leg 24, a push bar 26 for a stroller handle, and a side link 28. These components are arranged to generally define what is known in the art as an A-frame stroller. Each frame side also includes a fold joint 30 constructed in accordance with the teachings of the present invention.

The push bars 26 each have a lower end 32 connected to a respective one of the fold joints 30. Each push bar 26 also has an upper end connected to a handle bar or grip 34 that extends transversely between and interconnects the push bars 26, forming a handle assembly 36. The handle assembly 36 extends upward and rearward from the frame sides and fold joints 30 when in the in-use configuration of FIG. 1. An arm bar or tray 38 extends transversely between and connects forward ends of the side links 28 to one another in this example. The seat (not shown) would be positioned between the frame sides and rearward of the arm bar as is known in the art. A U-shaped basket frame 40 extends from and interconnects the side links 28 across the frame assembly 20 in this example. A front wheel assembly 42 with dual wheels and swivel capability is carried on a lower end of each front leg 22, as is known in the art. A rear wheel 44 is carried on the lower end of each rear leg 24, also as is known in the art. A footrest 46 extends transversely between the front legs 22 nearer the lower ends.

In general, the front legs 22 extend upward and rearward toward the respective fold joints 30 and the rear legs 24 extend upward and forward toward the respective fold joints. Each side link 28 extends generally horizontally front to back between the corresponding front and rear legs 22, 24. The side link 28 is pivotally connected, directly or indirectly, to its respective front and rear legs 22, 24. The side links 28 are also positioned below the level of the fold joints 30, thus defining an A-frame structure in combination with the front and rear legs for the frame assembly 20 in this example. A front cross-brace 48 extends between about a mid-point of the front legs 22. A rear axle 50 extends between the rear legs 24 near the lower ends. A rear cross-brace 52 extends between the side links 28 and is coupled to connectors 54, which are positioned on opposed sides of the basket frame 40. The connectors 54 connect the side links 28 to the basket frame 40 and the basket frame and side links to the rear legs 24.

The fold joints 30 and frame sides are essentially mirror images of one another. Therefore, the description provided below describes only the right side of the stroller frame assembly 20 and only the right side fold joint 30 in detail. The description of the left side fold joint 30 and frame side would essentially be identical to the right side.

Figure 4:
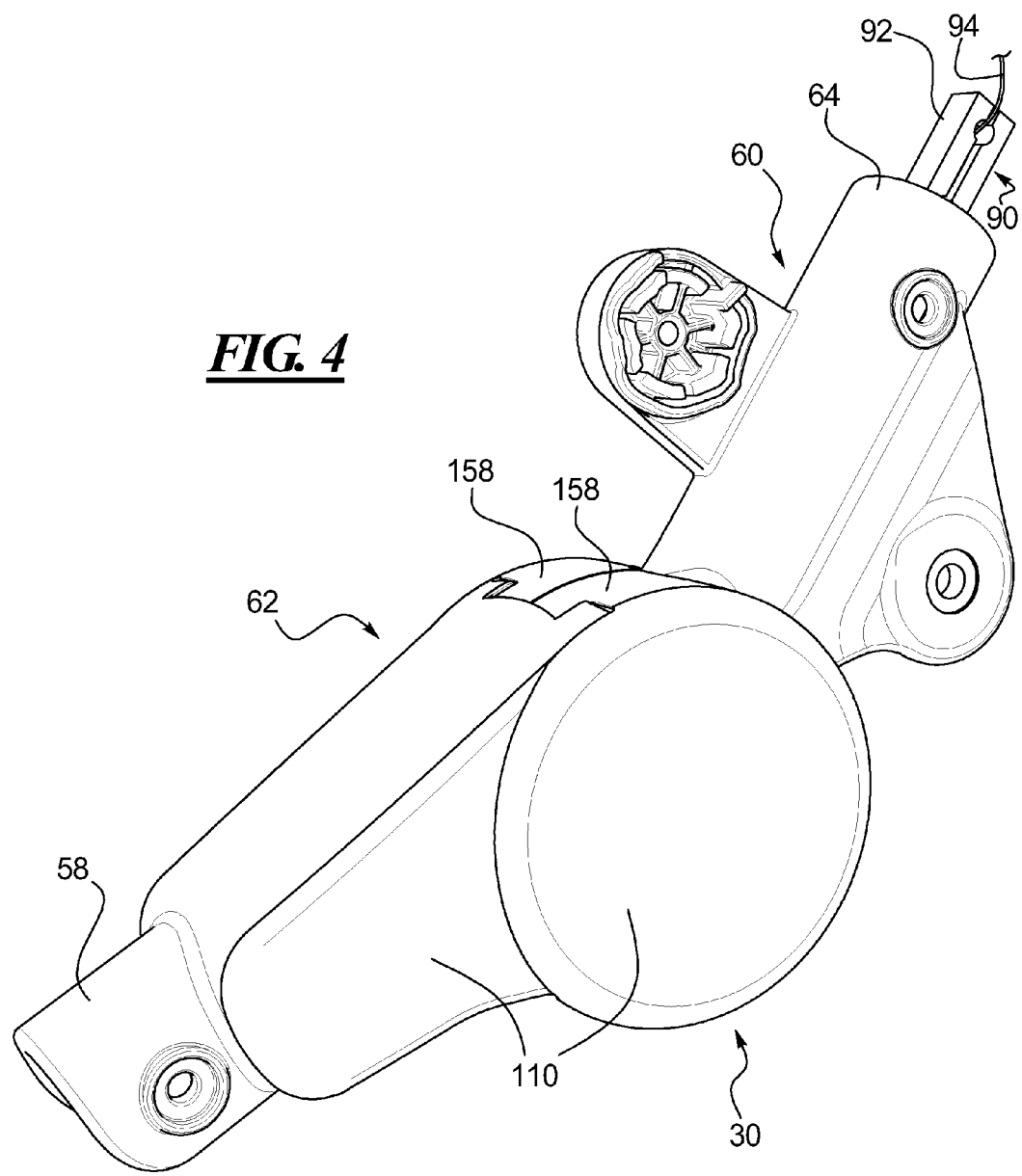
FIG. 4 shows an inside perspective view of the right side fold joint of the stroller frame shown in FIG. 1 and in an in-use orientation and latched arrangement corresponding to the in-use configuration of the stroller frame in FIG. 1.
Figure 5:
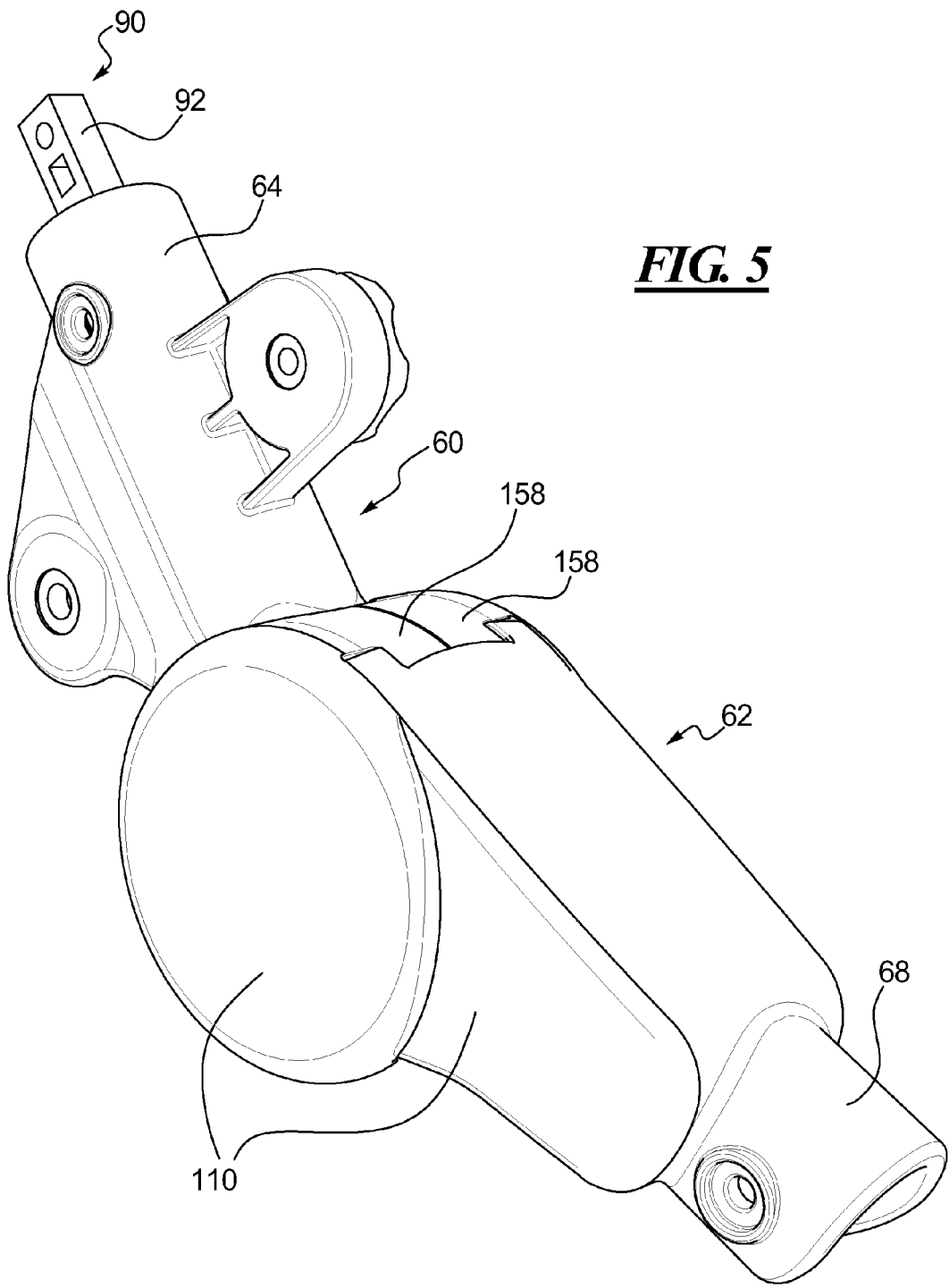
FIG. 5 shows the right side fold joint shown in FIG. 4 but from an opposite outside view.
Figure 6:
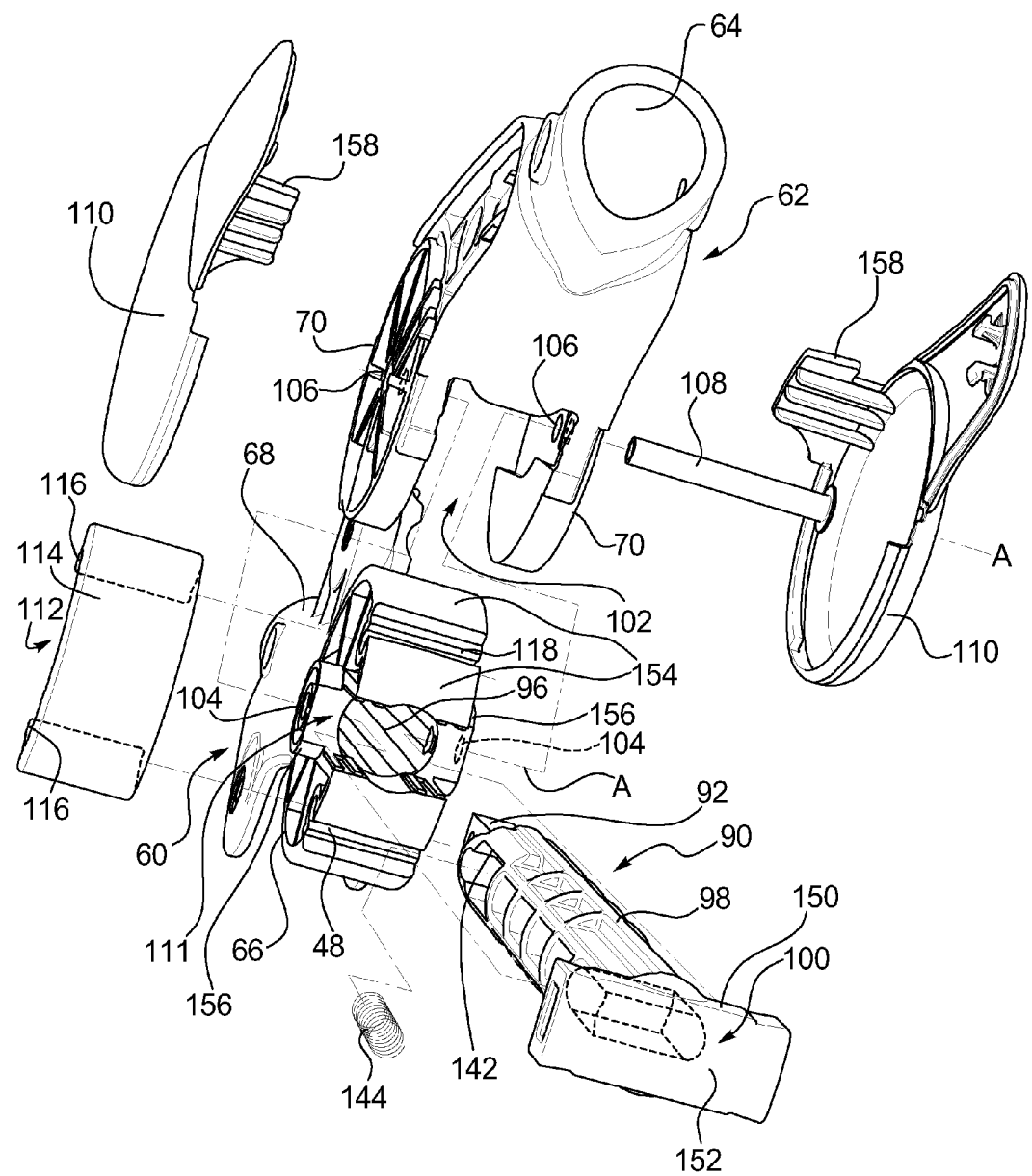
FIG. 6 shows an exploded view of the fold joint shown in FIGS. 4 and 5.

With reference to FIGS. 4-6, the fold joint 30 generally has two primary joint parts including a first part 60 and a second part 62 that are pivotally joined to one another at a pivot axis A or fold axis. The first part 60 has a hosel or connector 64 extending from a hub body 66. The axis A extends through the hub body 66 and the hosel 64 projects from the hub body in a radial direction. The lower end 32 of the push bar 26 is received in a hosel bore 67 within the hosel 64 via fasteners on the first part 60 of the fold joint 30. The second part 62 has a hosel or connector 68 extending from a pair of spaced apart and opposed plates 70. The axis A extends perpendicularly through the pair of plates 70 and the connector 68 projects from the plates also in a radial direction. An upper end 72 of the front leg 22 is received in a connector bore 73 and coupled to the connector 68 of the second part 62 of the fold joint 30.

Returning to FIGS. 1-3, an upper end 74 of the rear leg 24 is pivotally coupled at a pivot point RL to a standoff 76 carried on the first part 60 of the joint 30. The side link 28 is pivotally coupled at a pivot point SL near one end to a standoff 78 near the upper end 32 of the front leg 22. The side link 28 is also affixed to the arm bar or tray 38, as noted above. The side link 28 is pivotally coupled near an opposite end to the connector 54, which is pivotally connected at the pivot point C to the rear leg 24 below the upper end 74. The stand-off 78 and side link 28 pivot point SL is spaced from the pivot axis A. The rear leg upper end 74 and stand-off 76 pivot point RL is also spaced from the pivot axis A of the fold joint 30.

As will become evident to those having ordinary skill in the art, the size, shape, and positioning or arrangement of the various frame parts, pivot points, and the like can vary within the spirit and scope of the present invention from the example shown and described herein. These aspects of the frame assembly 20 can be modified to suit a particular stroller size, aesthetic look, or the like. The stand-offs 76, 78, and connector 54 can be replaced with other connections elements or types and/or can be connected to different parts than as depicted herein. The stand-off 78 is described herein as being connected to the front leg 22. Instead, the stand-off 78 or pivot point SL could be provided on the connector 68 of the second joint part 62. Likewise, the stand-off 76 is described herein as being part of the hosel 64. Instead, the stand-off or pivot point RL could be provided near the upper end 74 of the rear leg 24. Further, the connector 54 could be eliminated and the basket frame 40 and arm bar or tray 38 could be directly joined to one another and the pivot point C could be directly on the rear leg 24.

Figure 2:
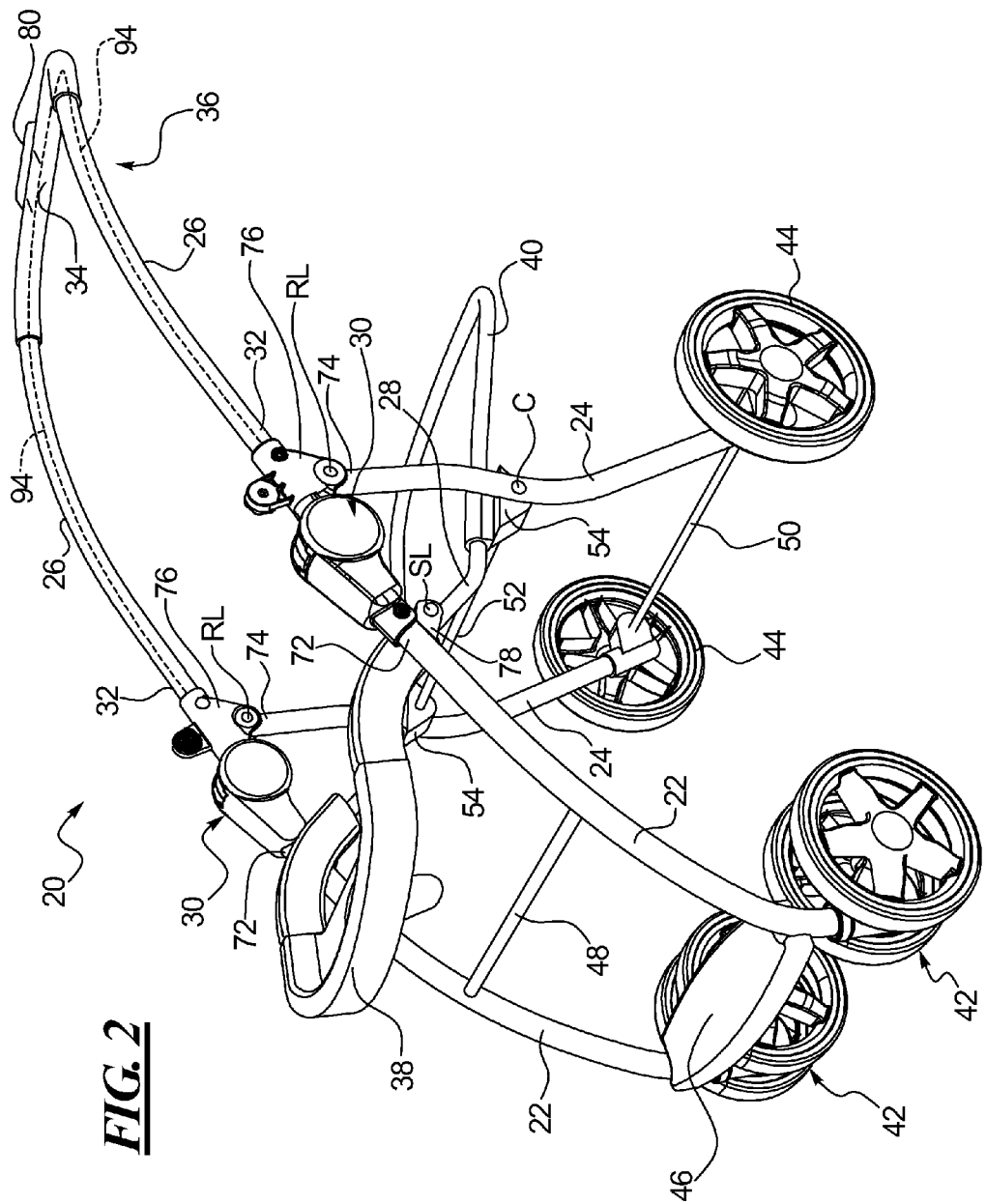
FIG. 2 shows the stroller frame shown in FIG. 1 but in a partially folded configuration.
Figure 3:
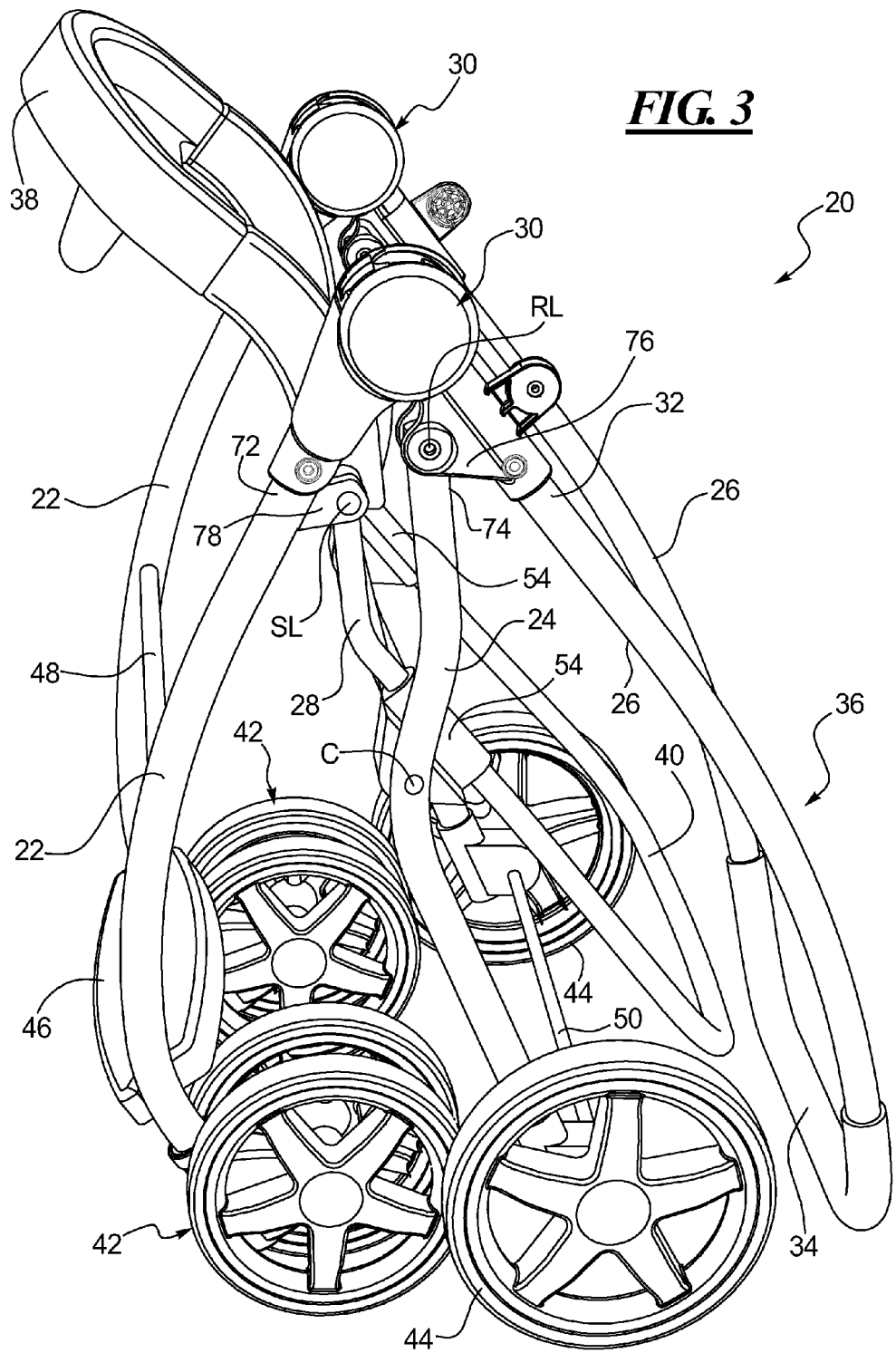
FIG. 3 shows the stroller frame shown in FIG. 2 but in a fully folded configuration.

In the disclosed example, the fold joint 30 generally has a hub formed by the puck-shaped hub body 66 and the plates 70. The pivot axis A extends perpendicularly through the center of the hub and defines the fold axis or pivot point of the fold joint. The frame assembly 20 is folded about the pivot axis A as shown in FIGS. 2 and 3. A release actuator 80 is provided on a handle bar 34 of the handle assembly 36 between the push bars 26. The release actuator 80 releases the fold joint 30, as described below in greater detail, allowing the frame assembly 20 to fold. When the fold joints 30 are released, the handle assembly 36 is pushed downward and rearward toward the rear legs 24 of the frame assembly 20 as can be seen in FIG. 2. This motion begins to move the fold joint 30 from an in-use orientation to a folded orientation and the stroller frame 20 from the in-use configuration toward the folded configuration of FIG. 3, wherein the stroller frame assembly is in fully or completely folded.

The disclosed fold joint 30 is configured and constructed to eliminate or significantly reduce the number of potential shear points or pinch points. The latching components within the fold joint 30 and the ends of the frame parts coupled thereto, i.e., the push bar lower end 32 and front leg upper end 72, remain covered by portions of the fold joint at all times. Thus, it can be difficult for objects to get caught within or between portions of the fold joint 30 or frame assembly 20 during folding and unfolding of the frame assembly.

FIGS. 4 and 5 show the right side fold joint 30 from opposite sides, respectively. The first part 60 houses a latch shuttle 90 with an actuator end 92 protruding from the free end of the hosel 64 and into the interior of the lower end 32 on the push bar 26 tube. As is known in the art, the actuator end 92 is connected to a cable 94 that extends up the interior push bar 26 tube to the handle bar 34 and is then connected to the release actuator 80 on the handle assembly 36. The hosel 64 protrudes radially from the hub of the fold joint 30 and the connector 68 protrudes from the hub of the fold joint in generally opposite directions in the in-use orientation of the fold joint.

With reference to FIG. 6, a through-bore or tunnel 96 extends through the hosel 64 and across and bisects the puck-shaped hub 66. The shuttle 90 is slidably received through the tunnel 96 with the actuator end 92 adjacent and within the hosel 64 as noted above. The shuttle 90 also includes an elongate shuttle body 98 extending from the actuator end 92. The shuttle body 98 terminates at a plunger end 100 opposite the actuator end 92. In the disclosed example, the plunger end 100 has a width that is wider than the width or size of the majority of the tunnel 96 and shuttle body 98.

With reference to FIGS. 6 and 7, the second joint part 62 defines a gap 102 between the plates 70. Each of the plates 70 is arranged extending from one end of the connector 68. An axle bore 104 extends through the center of the puck-shaped hub body 66 and an axle hole 106 extends through each of the plates 70. When the fold joint is assembled, the hub body 66 is captured or sandwiched between the plates 70 with the axle bore 104 aligned with the axle holes 106. A pivot pin or axle 108 is received through the bore 104 and holes 106, pivotally connecting the first and second joint parts 60, 62. In the disclosed example, the assembled fold joint 30 includes an outer face cap 110 snapped onto each side of the fold joint. The face caps 110 cover the exposed exterior surfaces of the plates 70 and portions of the connector 68 on the outer surfaces of the second part 62.

The tunnel 96 has a wider open end or plunger space 111 that coincides with the plunger end 100 on the shuttle 90. Thus, the shuttle 90 must be inserted into the hub of the fold joint 30 through that end of the hub body 66. When the shuttle 90 is inserted in the tunnel 96 through the first joint part 60 and the first part is connected to the second part 62, a bore cover 112 is attached to hide the plunger end 100 and to close off the plunger space 111 and the tunnel 96. The bore cover 112 in this example has a curved plate portion 114 that matches the curvature of the hub body 66. A pair of shaped tongues or keys 116 protrudes from the inner surface of the plate portion 114. A pair of like shaped ways or shaped grooves 118 extends laterally across the hub body 66. The bore cover 112 is attached prior to attaching the face caps 110 by sliding the keys 116 laterally into the grooves 118 across the hub body 66. The shape of the keys 116 and grooves 118 locks the bore cover 112 radially onto the hub body 66 and prevents the bore cover from being pushed radially off the hub body by the plunger end 100 of the shuttle 90 during us. Once the bore cover 112 is installed, the face caps 110 can be installed, which will prevent the bore cover from sliding out of the grooves sideways.

The inside surfaces of the plates 70 are shown in FIG. 8, one plate being a mirror image of the other. Each of the plates 70 has a thin wall portion or region 130, part of which surrounds the axle hole 106. The inside surface of each plate 70 also has thick wall portions or regions 132a, 132b adjacent portions of the circumferential edge 134 of the plate. The lateral distance or gap 102 between the confronting or facing thick wall portions 132 on the two adjacent plates 70 is narrower than the gap between the confronting or facing thin wall portions 130 of the plates. The thick wall portions 132a, 132b on each plate 70 in this example are separated by the thin wall portion 130 and merge toward one another near where the connector 68 is joined to each plate. The thick wall portions 132a, 132b transition to the thin wall portion 130 at stepped surfaces.

One of the stepped surfaces has a curved cam surface portion 136a that faces the axle hole 106 and a linear slot portion 138a where the stepped surfaces merge toward one another. The other of the stepped surfaces has a clearance portion 136b facing the cam surface portion 136a and has a linear slot portion 138b facing and parallel to the slot portion 138a. The axle hole 106 is generally between the cam surface portion 136a and the clearance portion 136b of the two thick wall regions 132a, 132b. Each of the cam surface portion 136a and clearance portion 136b terminates on the two plates 70 at the edge 134 of the respective plate opposite the slot portions 138a, 138b.

The distance or spacing between the linear slot portions 138a, 138b on each plate 70 is sized to match a thickness or depth of the plunger end 100 of the shuttle. The lateral gap or distance between the thin wall regions 130 on the adjacent plates 70 is sized to closely fit the width of the plunger end 100 on the shuttle 90. The lateral gap or distance between the confronting thick wall portions 136a, 136b on the adjacent plates is less that the width of the plunger end 100. Thus, the plunge end 100 will be captured generally between the thin wall portions 130 of the two plates within the confines of the stepped surfaces. The combination of the linear slot portions 138a, 138b on the two plates defines a latch slot between the plates 70. When the fold joint 30 is assembled, the plunger end 100 of the shuttle 90 seats and is captured within the slot defined by the slot portions 138a, 138b on both plates when in a latched position.

Figure 9:
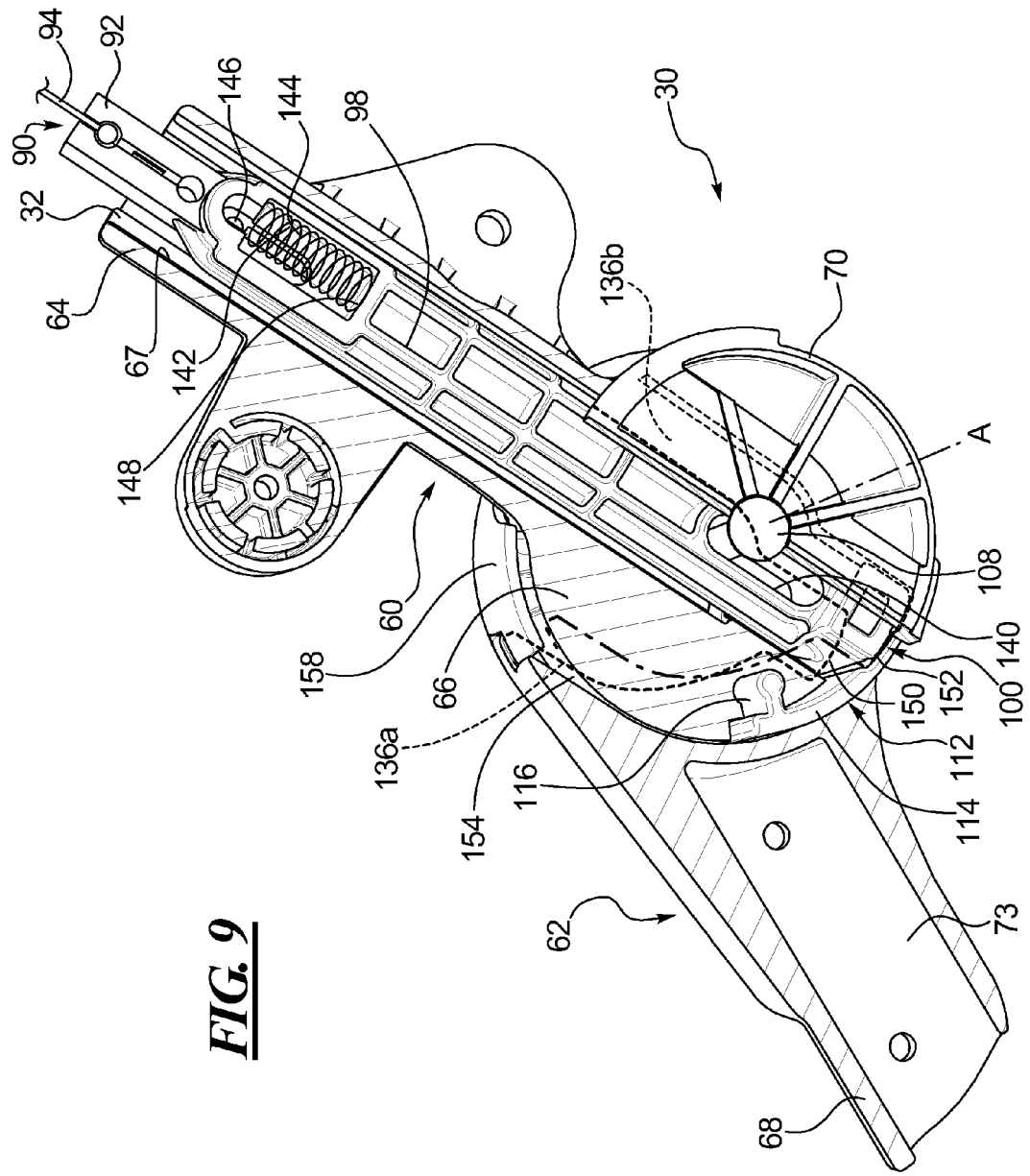
FIG. 9 shows a lengthwise cross-section of the fold joint shown in FIGS. 4 and 5 in the latched arrangement corresponding to the stroller frame shown in FIG. 1.

With reference to FIG. 9, the fold joint 30 is shown in cross-section in the in-use orientation and with the shuttle in the latched position, seated in the latch slot (between the plates 70 within the slot portions 138a, 138b). As shown, the shuttle body 98 includes a pair of lengthwise extending slots spaced apart from one another along the length of the shuttle body. The pivot pin or axle 108 is received through a first one of the shuttle slots 140 closest to the plunger end 100. A fastener (only the fastener opening 146 is shown) connects two halves of the first joint part 60 and extends through a second one of the shuttle slots 142 closer to the actuator end 92. The slots 140, 142 are elongate and allow the shuttle 90 to travel along the tunnel 96 within the hub body 66. The shuttle travel is limited by the length of the slots 140, 142, or at least the shorter of the two slots.

A spring 144 is provided below the fastener opening 146 within the second slot 142 in the shuttle body 98 and bears against a stop surface 148 on the body and against the fastener (not shown) therein. The fastener is fixed in position on the hosel 64 and lower end 32 of the push bar 26. The spring 144 biases the plunger end 100 into the latch slot toward the latched position of FIG. 9. The cable 94 connected to the actuator end 92 of the shuttle 90 can be pulled by squeezing the release actuator 80 at the handle bar 34. This in turn moves shuttle 90 against the bias force of the spring 144 toward the released position of FIG. 10.

Figure 10:
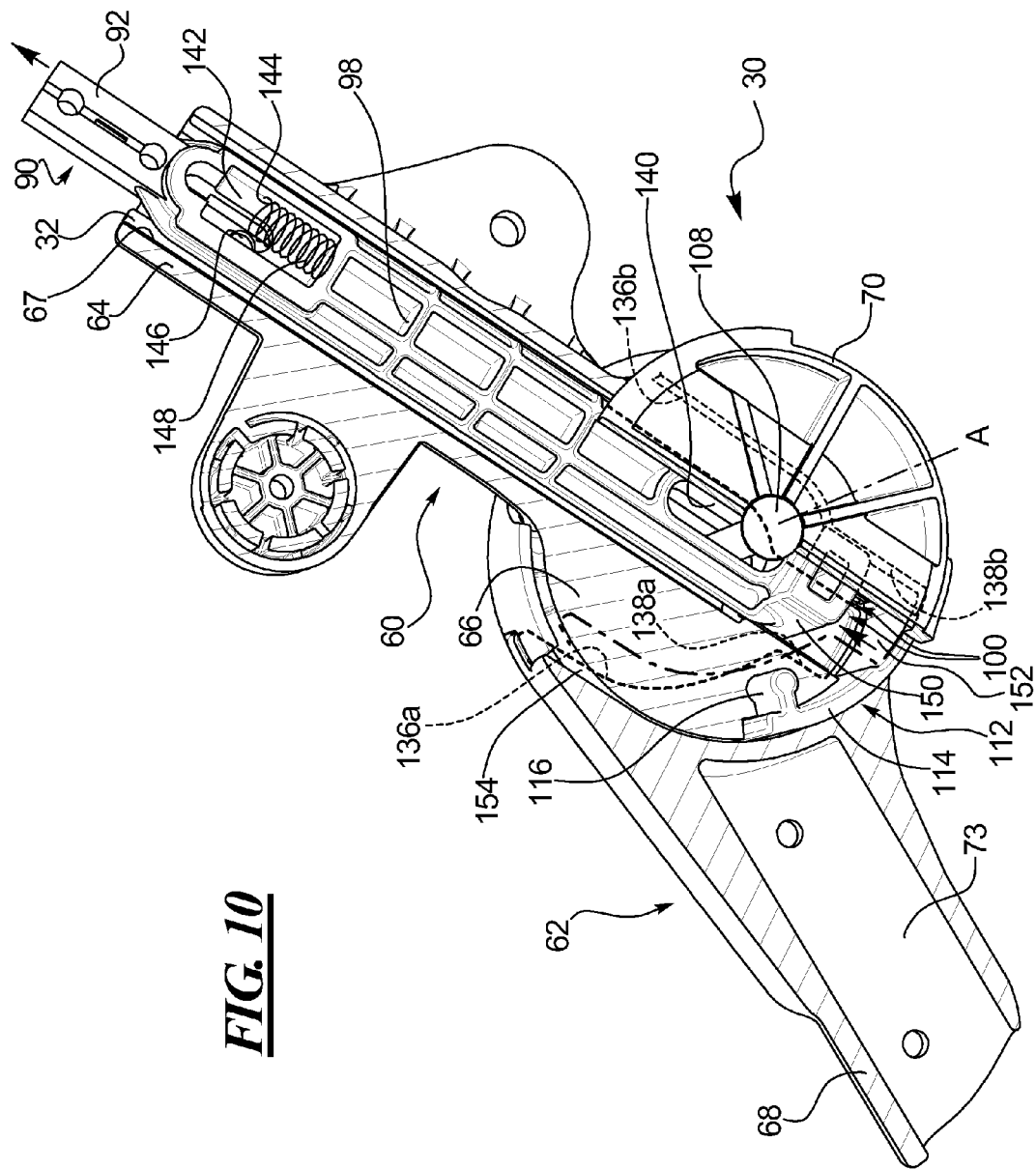
FIG. 10 shows the fold joint shown in FIG. 9 but in an unlatched or released arrangement.
Figure 11:
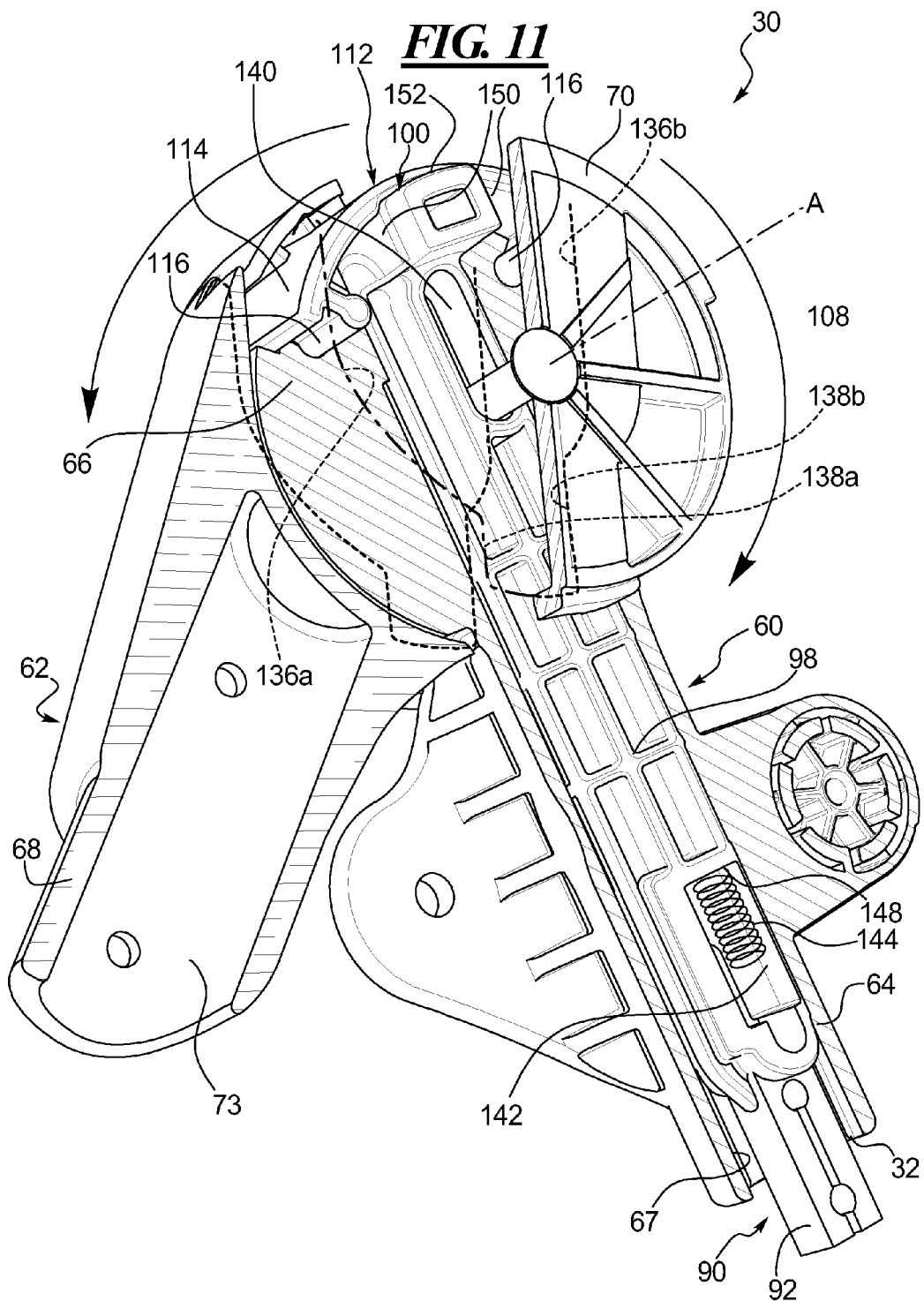
FIG. 11 shows the fold joint shown in FIG. 10 but in a folded orientation corresponding to the stroller frame shown in FIG. 3.

In the released position shown in FIG. 10, the plunger end 100 is withdrawn from the latch slot in the hub, i.e., the end is withdrawn from between the four slot portions 138a, 138 on the two plates 70. When the shuttle 90 is in the released position, the plunger end 100 is clear of the latch slot and thus the slot portions 138a, 138b of the stepped surfaces that define the slot. The opposed sides 150 of the plunger end 100 are then clear of the slot allowing the fold joint 30 to pivot from the in-use orientation. When the first joint part 60 is pivoted by moving the push bar 26 down relative to the second joint part 62, in the disclosed example the end face 152 of the plunger end 100 can ride along the curved cam surfaces 136a on the plates 70. This allows the user to let go of the release actuator 80 on the handle bar 34 and yet move the handle assembly 36 downward toward the folded configuration as depicted in FIG. 2. The curvature of the cam surfaces 136a is such that, as the frame assembly 20 moves closer to the folded configuration in FIG. 3, the shuttle 90 is returned to the latched position relative to the tunnel 96. This can reduce stress on the spring 144 and remove slack in the latch release cables 94 and the release actuator 80. This shuttle position and fold joint orientation can be seen in FIG. 11.

When the user wishes to return the frame assembly 20 to the in-use configuration of FIG. 1, they need only lift the handle assembly 36 upward and away from the rear legs 24. The plunger end 100 will again ride along the curved cam surfaces 136a on the plates 70 of the second joint part 62, gradually returning the shuttle 90 and plunger end 10 to the released position of FIG. 10 within the tunnel 96 of the hub body 66. When the plunger end 100 is again aligned with the latch slot, the spring 144 will fire the shuttle 90 toward the latch slot and the plunger end 100 into the latch slot between the slot portions 138a, 138b on the plates. This orientation of the fold joint 30 and position of the shuttle 90 secures the frame assembly 20 in the in-use configuration.

The circumferential surface 154 of the puck-shaped hub body 66 can be radially flush with the perimeter edges 134 of the plates 70. This can eliminate differences in elevation between the relative moving parts of the joint structure and thus eliminate further pinch points, shear points, or offsets where objects could otherwise be caught as the fold joint is moved between positions or orientations. The bore cover 114 remains of the end of the tunnel 96 to hide and cover the plunder end 100 at all times as the joint parts rotate. The cover 112 moves in concert with the first joint part 60 and thus always hides the plunger end 100 and the exposed end of the latch slot or tunnel 96, again avoiding pinch points, shear points, and offsets between adjacent moving surfaces of the fold joint structure.

An integral bearing or bushing 156 can protrude from each side of the hub body 66 surrounding the axle bore 104. These bearings or bushings provide a bearing surface on their respective exposed ends. The bearing surfaces provide internal clearance between the hub body side faces and the plates 70, avoiding significant surface contact within the assembled hub. This can reduce surface friction when the fold joint 30 is pivoted between orientations. The thin wall regions 130 of the plate 70 inside surfaces can continue to one edge 134 of each plate, thus producing a wider gap 102 between the plates at this point. This wider gap region can provide an entry point for the bearings or bushings 156 on the hub body 66 when assembling the first and second joint parts 60, 62.

As shown in FIGS. 6-9 and 11, the face caps 110 each have an axial flange segment 158 projecting inward toward the other face cap when assembled. The flange segments 158 interlock when assembled to cover the gap between the plates 70 at notched portions 160 in the edges 134 on the plates. The flange segments also can create a travel stop to limit rotational travel of the push arm 26. The flange segments 158 can stop the push arm 26 when the shuttle 90 is aligned with the latch slot in the plates 70. This feature can be provided so that the shuttle 90 does not bypass the latch slot and the push arm 26 does not over rotate when the frame assembly 20 is unfolded to the in-use configuration. When the fold joint 30 moves from the in-use orientation to the folded orientation, only the surface 154 of the hub body 66 will be exposed beyond the flange segments 158. When the hub body 66 reaches the fold orientation of FIG. 11, the bore cover may be exposed or partly exposed. However, the cover hides the plunger and tunnel. Clearance within the gap 102 between the plates and adjacent the connector 68 can be provided to allow the bore cover 114 to rotate therein between the two fold joint orientations.

The disclosed fold joint 30 creates an enclosed joint that covers or hides both the frame parts connected to the joint parts and internal latching components of the joint. The only exposed surfaces at the joint may be the circumferential surface of the hub body 66. The plates 70 could have integral fenders or flanges that hide or cover the tunnel opening at the plunger end 100 of the shuttle. Thus, the bore cover could be eliminated. Likewise, the plates could have integral fenders or flanges that replace the face cap flanges. Either set of flanges or fenders can aid in hiding or covering internal joint and latch components as the fold joint is folded and unfolded. The disclosed fold joint 30 is constructed so that the latching of the shuttle takes place entirely internal to the joint, i.e., within the hub body and between the plates. All of the openings into the joint structure are covered and all of the connections between the frame components and the joint parts are also covered.

The various features and components of the fold joint 30 and frame assembly 20 can vary from the example disclosed and described above. Also, ribs, hollows, surface contours, cutouts, and the like can be added to add strength, rigidity, and the like to the fold joint while reducing material usage. Such features can also vary considerably in shape and configuration.

Figure 12:
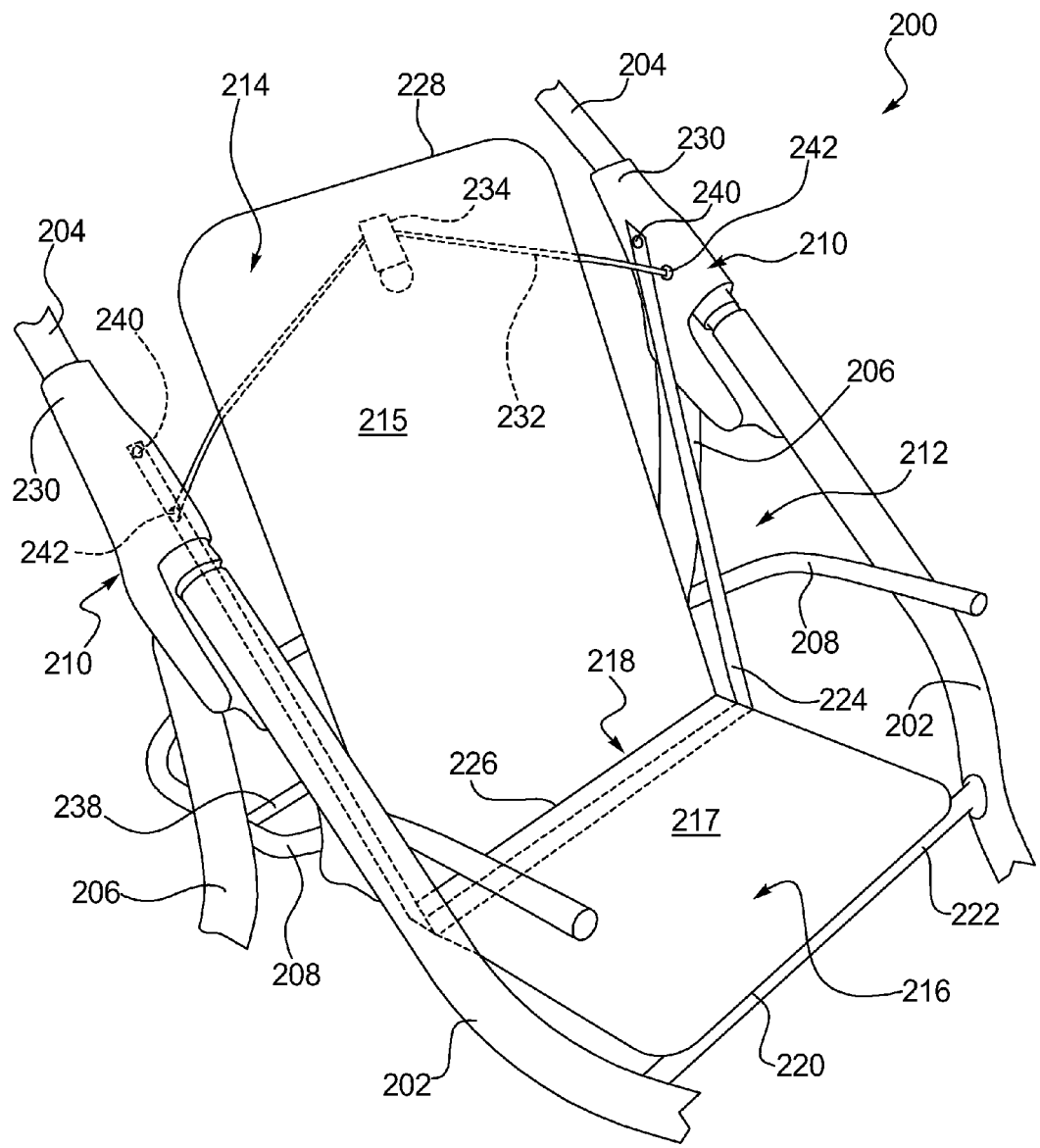
FIG. 12 shows a front perspective view of a portion of an alternate example of a stroller frame and seat assembly constructed in accordance with the teachings of present invention.
Figure 13:
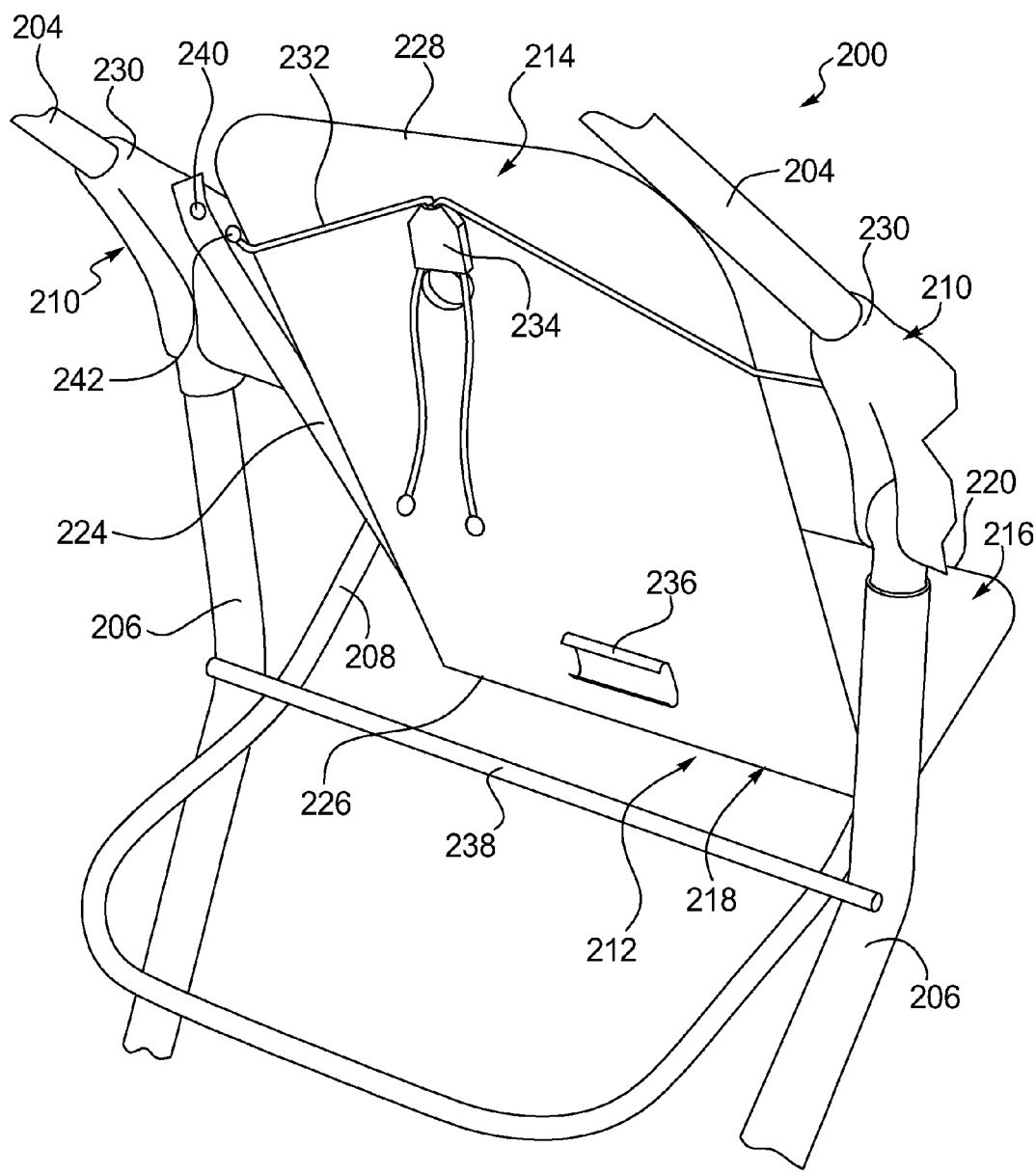
FIG. 13 shows a rear perspective view of the stroller frame and seat assembly shown in FIG. 12.

FIGS. 12 and 13 illustrate an alternate embodiment of a stroller frame assembly 200 constructed in accordance with the teachings of the present invention. The disclosed frame assembly 200 is again in the form of an A-frame structure that generally includes a pair of spaced apart frame sides. Each frame side has a front leg 202, a push bar 204, a rear leg 206, and a side link 208 extending between the front and rear legs. Each frame side also has a fold joint 210, which can be similar to the earlier described fold joint 30 or completely different.

In this example, the frame assembly 200 is shown with a seat assembly 212 suspended from the frame assembly between the frame sides. The seat assembly 212 generally has a seat back 214 with a back seating surface 215 and a seat bottom or pan 216 with a bottom seating surface 217. The seat back 214 is joined to the seat bottom 216 at a seat bight region 218. A forward edge 220 of the seat bottom 216 is pivotally connected to a cross member 222 extending between the front legs 202 of the frame sides. A flexible lanyard 224 is suspended from the inside surfaces of the fold joints 210. The lanyard 224 can be a flexible strap that continues from one of the fold joints 210 downward, underneath the seat assembly 212, and then upward to the other fold joint. In the disclosed example, the lanyard 224 is connected to the seat bottom 216 near the trailing edge 226 under the seat bight region 218. The seat assembly 212, and particularly the seat bottom 216, is thus suspended from the frame assembly 200 by the lanyard 224 or strap.

As shown in FIGS. 12 and 13, an upper end 228 of the seat back 214 is connected to push bar portions 230 of the fold joints 210 by a recline strap 232 or lanyard. As is known in the art, the recline strap 232 can be length adjustable to raise and lower the incline or height of the seat back 214 relative to the push bars 204. In the disclosed example, the recline strap 232 is loosely tethered to the backside of the seat back 214 by a loop 234 sewn or otherwise adhered to the seat back. A fold control plate 236 is adhered to a lower end 238 of the seat back 214 on its backside. The control plate 236 in this example is a curved C-shaped plate. A cross member 238 extends between the frame sides and is coupled to the side link 208 behind the rear legs 206. The control plate 236 can contact the cross member 238 during folding of the frame assembly 200 in order to control the position of the seat assembly 212.

Figure 14:
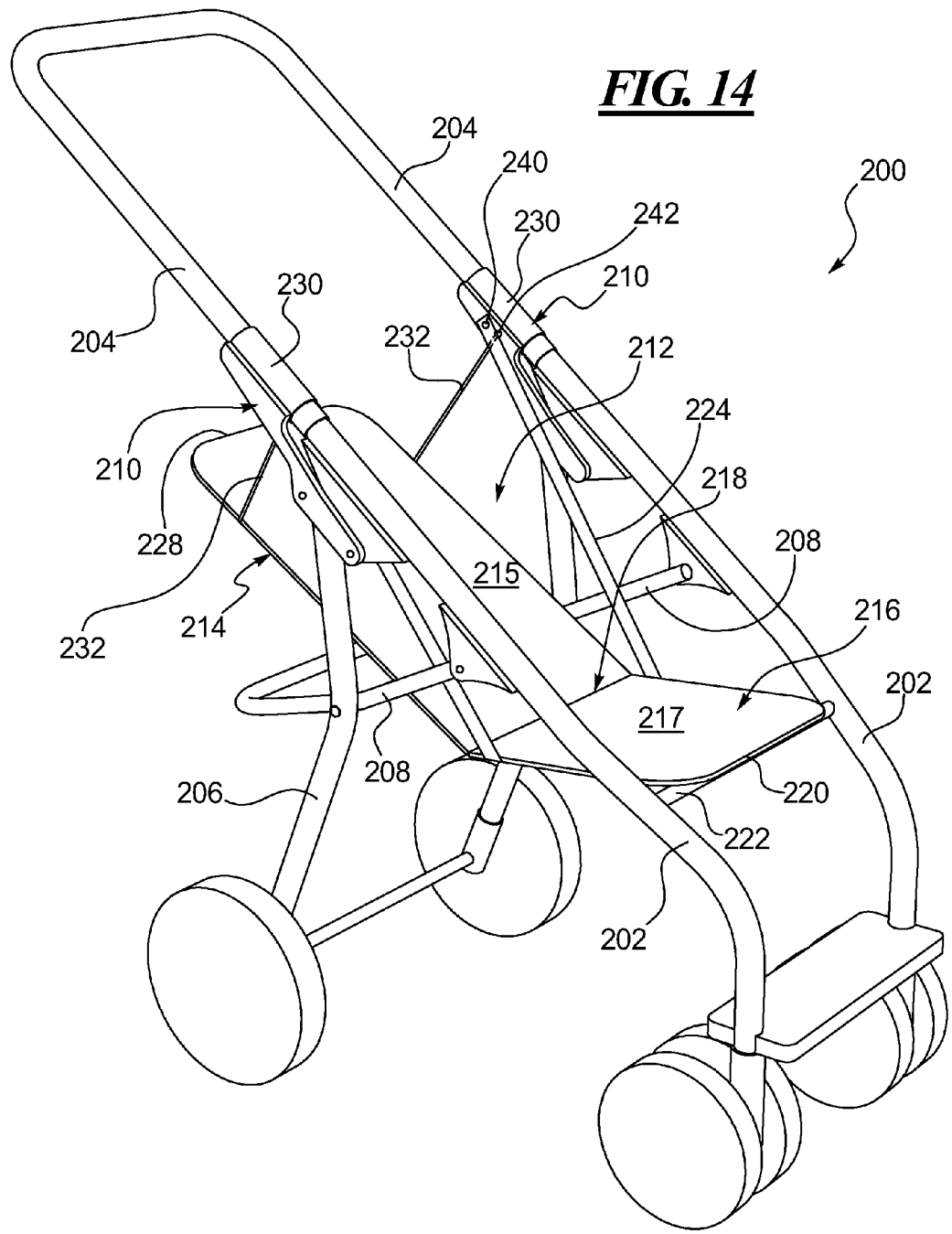
FIG. 14 shows a side view of the entire stroller frame shown in FIG. 12 and in an in-use or set up configuration.
Figure 15:
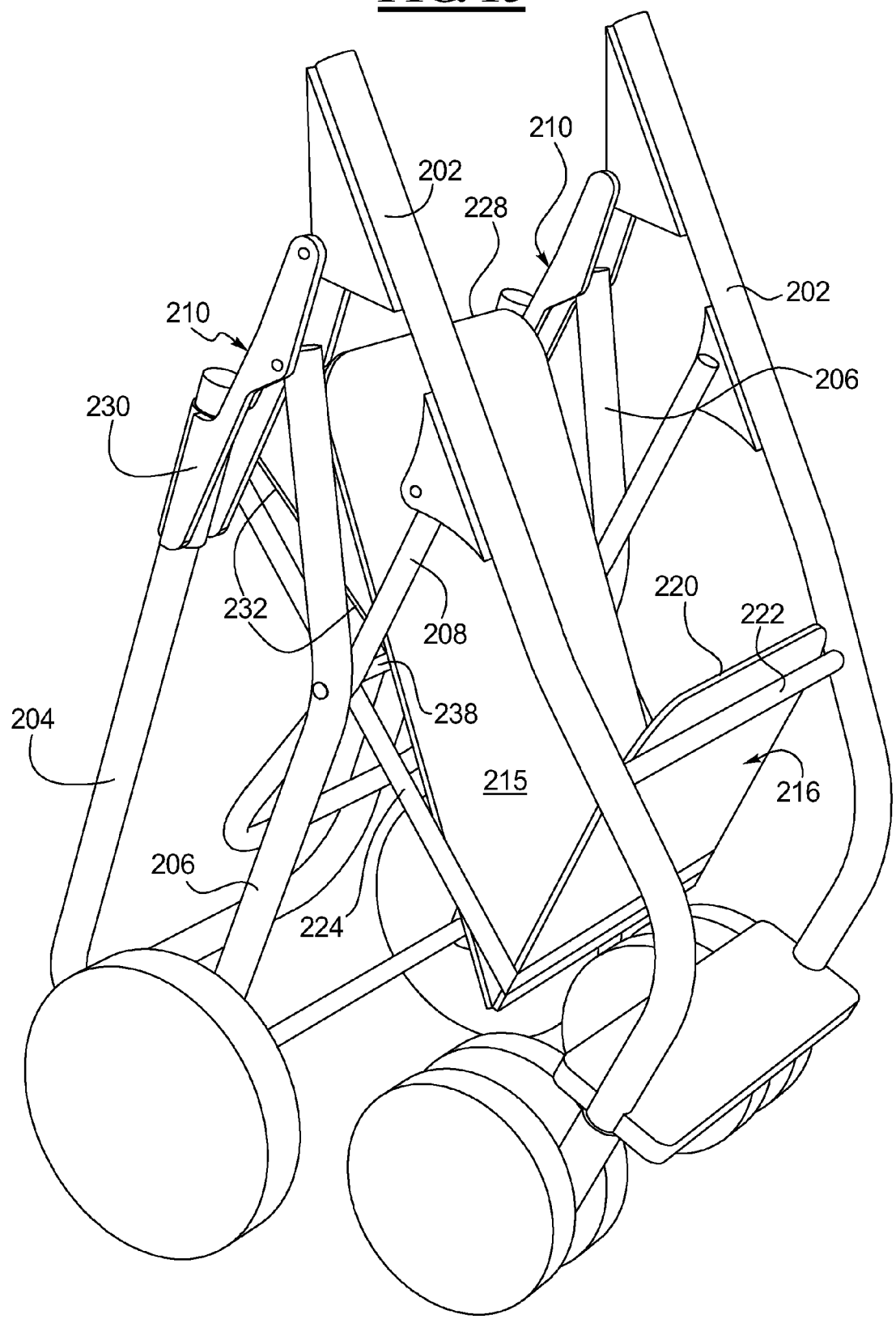
FIG. 15 shows a side view of the stroller frame shown in FIG. 14 but in a fully folded configuration.

FIG. 14 shows the entire frame assembly 200 in the in-use configuration. The seat back 214 is also reclined in order to show that its position is adjustable by adjusting the length of the recline strap 232. FIG. 15 shows the frame assembly 200 in a completely folded configuration. Similarly to the earlier described stroller frame assembly 20, the frame assembly 200 can be folded by releasing and lowering the handle assembly and thus the push bars 204 downward and rearward toward the rear legs 206. When the frame assembly 200 is folded, the back or trailing edge 226 of the seat bottom 216 drops significantly in order to move the seat bottom inward so that it seating surface 217 does not face forward or outward relative to the front of the folded frame assembly 200. The drop of the seat bottom 216 is caused by the position of the lanyard 224 connection points to the fold joints 210, which are located spaced upward of the fold joint pivot. The top ends 240 of the lanyard will drop down quickly as the handle assembly is lowered. The positioning of the attachment points 242 of the recline straps 232 on the fold joints 210 are such that the recline strap upper ends will be higher than the upper ends 240 of the lanyard 224 as the push bars 204 are lowered. Thus, the seat back 214 will not drop as quickly as the back edge 226 of the seat bottom 216. This will lift or tilt the seat back 214 forward toward the seat bottom 216. When the stroller frame assembly 200 is folded, the seating surfaces 215, 217 of the seat back 214 and seat bottom 216, respectively, will confront or closely face one another, as shown in FIG. 15.

The control plate 236 on the back side of the seat back 214 can catch on the cross member 238 extending between the side links 208 and frame sides. Movement of the control plate 236 relative to the recline strap 232 can assist in retaining the vertical, forward facing orientation of the seat back 214 during folding of the frame assembly 200. With reference to FIG. 15, the seat bottom seating surface 217 faces inward relative to the folded frame structure of the frame assembly 200 and also faces the seat back seating surface 215. Thus, the seating surface 217 is not exposed to the exterior of the folded structure. Similarly, the seat back 214 faces the seat bottom 216. Thus, a good portion of the seating surface 215 on the seat back 214 is also not exposed to the outside of the folded frame structure.

The seat back 214 is also positioned suspended relatively in line with the rear legs 206 in the folded frame structure. The rear legs 206 are sandwiched between the front legs 202 and the downwardly folded push bars 204. With the seat back 214 positioned in the middle of the folded frame structure as well, the upper end of the seating surface 215 on the seat back 214 also will not be directly exposed to the exterior of the folded frame structure. As a result, the completely folded frame assembly 200 as depicted in FIG. 15 can be stowed on virtually any surface without the seating surfaces 215, 217 being easily contaminated by contacting dirty surfaces. The seating surfaces are not exposed for such contact.

Although certain foldable strollers, fold joints, and stroller seats have been described herein in accordance with the teachings of the present disclosure, the scope of coverage of this patent is not limited thereto. On the contrary, this patent covers all embodiments of the teachings of the disclosure that fairly fall within the scope of permissible equivalents.

What is claimed is:

1. A stroller fold joint comprising:
   a first joint part with a hub body having a puck shape, a circumferential surface, and a pivot axis extending transversely through the hub body;
   a second joint part with two plates having confronting surfaces spaced apart by a gap therebetween, the hub body captured in the gap between the two plates, the first and second joint parts pivotable relative to one another about the pivot axis between a folded orientation and an unfolded orientation;
   cam surfaces defined on the confronting surfaces of the two plates;
   a latch slot defined on the confronting surfaces of the two plates adjacent the cam surfaces;
   a tunnel along and through the hub body perpendicular to the pivot axis, the tunnel bisecting the hub body and being aligned with the pivot axis; and
   a shuttle slidable within the tunnel and having a latch end and an actuator end, the shuttle biased to a latched position with the latch end captured in the latch slot retaining the fold joint in the unfolded orientation,
   wherein moving the shuttle to a released position withdraws the latch end from the latch slot permitting relative rotation of the first and second joint parts from the unfolded orientation to the folded orientation.

2. A stroller fold joint according to claim 1, wherein, when the fold joint is moved from the unfolded orientation toward the folded orientation, the latch end of the shuttle bears against the cam surfaces.

3. A stroller fold joint according to claim 1, wherein, when the fold joint moves from the unfolded orientation to the folded orientation, the cam surfaces guide the latch end of the shuttle back to the latched position.

4. A stroller fold joint according to claim 3, wherein, when the fold joint is moved from the folded orientation to the unfolded orientation, the latch end is guided by the cam surfaces back to the released position when adjacent the latch slot.

5. A stroller fold joint according to claim 1, wherein, when the fold joint is moved from the folded orientation to the unfolded orientation, the latch end clears the cam surfaces and aligns with the latch slot.

6. A stroller fold joint according to claim 5, wherein a spring biases the shuttle toward the latched position and when the latch end clears the cam surfaces the spring fires the shuttle into the latch slot and to the latched position.

7. A stroller fold joint according to claim 1, wherein the actuator end is connected to a release cable.

8. A stroller fold joint according to claim 1, wherein the shuttle has an elongate body and a first slot formed therethrough, and wherein a pivot pin through the hub body and two plates defines the pivot axis and passes through the first slot.

9. A stroller fold joint according to claim 1, wherein one end of the tunnel is aligned with a hosel bore of a hosel on the first joint part and the actuator end of the shuttle projects from the hub body into the hosel bore.

10. A stroller fold joint according to claim 9, wherein the other end of the tunnel opens to the circumferential surface of the hub body opposite the hosel.

11. A stroller fold joint according to claim 1, wherein the circumferential surface is substantially closed, other than where ends of the tunnel open thereto so that the circumferential surface is exposed as the fold joint is moved between the folded and unfolded orientations.

12. A stroller fold joint according to claim 1, wherein one end of the tunnel is aligned with a hosel bore of a hosel on the first joint part and the other end of the tunnel opens to the circumferential surface of the hub body opposite the hosel, and wherein a bore cover is secured to the hub body closing off the other end of the tunnel.

13. A stroller fold joint comprising:
a first joint part with a frame connection hosel coupled to a hub body having a puck shape, a circumferential surface, and a pivot axis extending transversely through the hub body;
a second joint part with a frame connector coupled to two plates having a gap between confronting spaced apart surfaces of the two plates, the hub body sandwiched between the two plates and the first and second joint parts pivotable about the pivot axis relative to one another between a folded orientation and an unfolded orientation;
a tunnel along and through the hub body perpendicular to the pivot axis;
a bore cover attached to the circumferential surface of the hub body and over the one end of the tunnel; and
a shuttle slidable within the tunnel and having an elongate body, a latch end, and an actuator end, the latch end positioned adjacent the circumferential surface of the hub body at one end of the tunnel and the actuator end extending at least into the frame connection hosel,
wherein, when the fold joint is in the folded orientation, the unfolded orientation, or moving therebetween, the shuttle is not exposed but covered by portions of the fold joint.

14. A stroller fold joint according to claim 13, further comprising an end of a first stroller frame part received within the frame connection hosel and an end of a second stroller frame part received within the frame connector, wherein the ends of the first and second stroller frame parts are not exposed when the fold joint is in the folded orientation, the unfolded orientation, or moving therebetween.

15. A stroller fold joint according to claim 13, wherein only the circumferential surface of the hub body and/or the bore cover are exposed between the two plates.

16. A stroller frame assembly having a pair of frame sides, each frame side comprising:
a front frame leg having an upper end;
a handle push bar having a lower end; and a fold joint including
a first joint part with a hosel coupled to a hub body having a puck shape, a circumferential surface, and a pivot axis extending transversely through the hub body, the lower end of the push bar received within the hosel;
a second joint part with a connector coupled to two plates having a gap between confronting spaced apart surfaces of the two plates, the hub body sandwiched between the two plates and the upper end of the front frame leg received within the connector, the first and second joint parts pivotable about the pivot axis relative to one another between a folded orientation and an unfolded orientation;
a tunnel along and through the hub body perpendicular to the pivot axis; and
a shuttle slidable within the tunnel and having an elongate body, a latch end, and an actuator end, the latch end positioned adjacent the circumferential surface of the hub body at one end of the tunnel and the actuator end extending at least into the hosel,
wherein, when the fold joint is in the folded orientation, the unfolded orientation, or moving therebetween, the shuttle, the lower end of the push bar, and upper end of the front frame leg are not exposed but covered by portions of the fold joint.

17. A stroller fold joint comprising:
a first joint part with a hub body having a puck shape, a circumferential surface, and a pivot axis extending transversely through the hub body;
a second joint part with two plates having confronting surfaces spaced apart by a gap therebetween, the hub body captured in the gap between the two plates, the first and second joint parts pivotable relative to one another about the pivot axis between a folded orientation and an unfolded orientation;
cam surfaces defined on the confronting surfaces of the two plates;
a latch slot defined on the confronting surfaces of the two plates adjacent the cam surfaces;
a tunnel along and through the hub body perpendicular to the pivot axis; and
a shuttle slidable within the tunnel and having a latch end and an actuator end, the shuttle biased to a latched position with the latch end captured in the latch slot retaining the fold joint in the unfolded orientation, the shuttle having an elongate body and a first slot formed therethrough,
wherein moving the shuttle to a released position withdraws the latch end from the latch slot permitting relative rotation of the first and second joint parts from the unfolded orientation to the folded orientation, and
wherein a pivot pin through the hub body and two plates defines the pivot axis and passes through the first slot.

18. A stroller fold joint comprising:
a first joint part with a hub body having a puck shape, a circumferential surface, and a pivot axis extending transversely through the hub body;
a second joint part with two plates having confronting surfaces spaced apart by a gap therebetween, the hub body captured in the gap between the two plates, the first and second joint parts pivotable relative to one another about the pivot axis between a folded orientation and an unfolded orientation;
cam surfaces defined on the confronting surfaces of the two plates;
a latch slot defined on the confronting surfaces of the two plates adjacent the cam surfaces;
a tunnel along and through the hub body perpendicular to the pivot axis; and
a shuttle slidable within the tunnel and having a latch end and an actuator end, the shuttle biased to a latched position with the latch end captured in the latch slot retaining the fold joint in the unfolded orientation,
wherein moving the shuttle to a released position withdraws the latch end from the latch slot permitting relative rotation of the first and second joint parts from the unfolded orientation to the folded orientation, and
wherein the circumferential surface of the hub body is substantially closed, other than where ends of the tunnel open thereto so that the circumferential surface is exposed as the fold joint is moved between the folded and unfolded orientations.

19. A stroller fold joint comprising:
a first joint part with a hub body having a puck shape, a circumferential surface, and a pivot axis extending transversely through the hub body;
a second joint part with two plates having confronting surfaces spaced apart by a gap therebetween, the hub body captured in the gap between the two plates, the first and second joint parts pivotable relative to one another about the pivot axis between a folded orientation and an unfolded orientation;
cam surfaces defined on the confronting surfaces of the two plates;
a latch slot defined on the confronting surfaces of the two plates adjacent the cam surfaces;
a tunnel along and through the hub body perpendicular to the pivot axis; and
a shuttle slidable within the tunnel and having a latch end and an actuator end, the shuttle biased to a latched position with the latch end captured in the latch slot retaining the fold joint in the unfolded orientation,
wherein moving the shuttle to a released position withdraws the latch end from the latch slot permitting relative rotation of the first and second joint parts from the unfolded orientation to the folded orientation,
wherein one end of the tunnel is aligned with a hosel bore of a hosel on the first joint part and the other end of the tunnel opens to the circumferential surface of the hub body opposite the hosel, and
wherein a bore cover is secured to the hub body closing off the other end of the tunnel.

* * * * *